United States Patent [19]

Schweiger

[11] Patent Number: 5,067,045
[45] Date of Patent: Nov. 19, 1991

[54] OUTPUT PROTECTION SCHEME FOR UNIPOLAR CONSTANT CURRENT SOURCE

[75] Inventor: Thaddeus J. Schweiger, St. Petersburg, Fla.

[73] Assignee: Square D Company, Palatine, Ill.

[21] Appl. No.: 358,746

[22] Filed: May 30, 1989

Related U.S. Application Data

[63] Continuation of Ser. No. 69,334, Jul. 1, 1987, abandoned.

[51] Int. Cl.$^5$ ............................................. H02H 9/04
[52] U.S. Cl. .................................. 361/56; 361/111; 361/119
[58] Field of Search ................... 361/56, 26, 91, 110, 361/111; 330/207 P, 278; 389/331, 412

[56] References Cited

U.S. PATENT DOCUMENTS 3,982,173  9/1976  Berry et al. ................... 361/56 X
4,644,294  2/1987  Palara et al. .................. 361/56 X Primary Examiner—A. D. Pellinen
Assistant Examiner—Stephen Jackson
Attorney, Agent, or Firm—Michael J. Femal; Hugh M. Gilroy

[57] ABSTRACT

A protection circuit for the output stage of an operational amplifier may utilize two diodes and two resistors. A circuit for protecting electronic components from the voltage on the cable has an operational amplifier having the signal connected to an input, a diode oriented to conduct the signal from an output of the operational amplifier to the cable, and a diode for shunting a voltage, of a polarity opposite the polarity of the signal, from a first conductor of the cable to a second conductor of the cable, and at least one resistor for limiting current flow to the second diode.

13 Claims, 1 Drawing Sheet

OUTPUT PROTECTION SCHEME FOR UNIPOLAR CONSTANT CURRENT SOURCE

This is a continuation of co-pending application Ser. No. 07/069,334 filed on July 1, 1987 now abandoned.

This invention relates to apparatus for protection of electronics from voltage surges, and more particularly, relates to protection of an output stage from surge voltages on a twisted pair communications line.

BACKGROUND OF THE INVENTION

In designing the output stage of an apparatus which provides a direct current (DC) output signal, it is necessary to protect the output stage operational amplifiers from voltage surges inadvertently occurring on the output line. The operational amplifier may, for example, drive a twisted pair cable, a telephone line, or a co-axial conductor, etc.

Many output protection schemes have been devised for devices driving two wire lines. Such devices include modems which drive telephone lines. The output stages of the modem must be protected against ringing voltages on the telephone lines. Also, output stages which drive twisted pair cables must be protected against currents produced by wrong connections at the far end of the cable. The far end of the cable may inadvertently be connected to a source of voltage. Also, surges may be induced electromagnetically in the cables, etc.

A problem remaining in the field of protection of the output stage of operational amplifiers from incoming voltage surges on a cable being driven by the amplifier includes providing protection in a simple and inexpensive manner. The simple and inexpensive solution must also provide sufficient protection for the output stage operational amplifiers.

SUMMARY OF THE INVENTION

The invention is a protection circuit for the output stage of an operational amplifier, and the circuit may utilize two diodes and two resistors. A circuit for protecting electronic components from the voltage on the cable has an operational amplifier having the signal connected to an input, a diode oriented to conduct the signal from an output of the operational amplifier to the cable, and a diode for shunting a voltage of a polarity opposite the polarity of the signal from a first conductor of the cable to a second conductor of the cable, and at least one resistor for limiting current flow to the second diode.

Other and further aspects of the present invention will become apparent during the course of the following description and by reference to the accompanying drawing.

BRIEF DESCRIPTION OF THE DRAWINGS

Referring now to the drawing.

DETAILED DESCRIPTION

Figure 1:
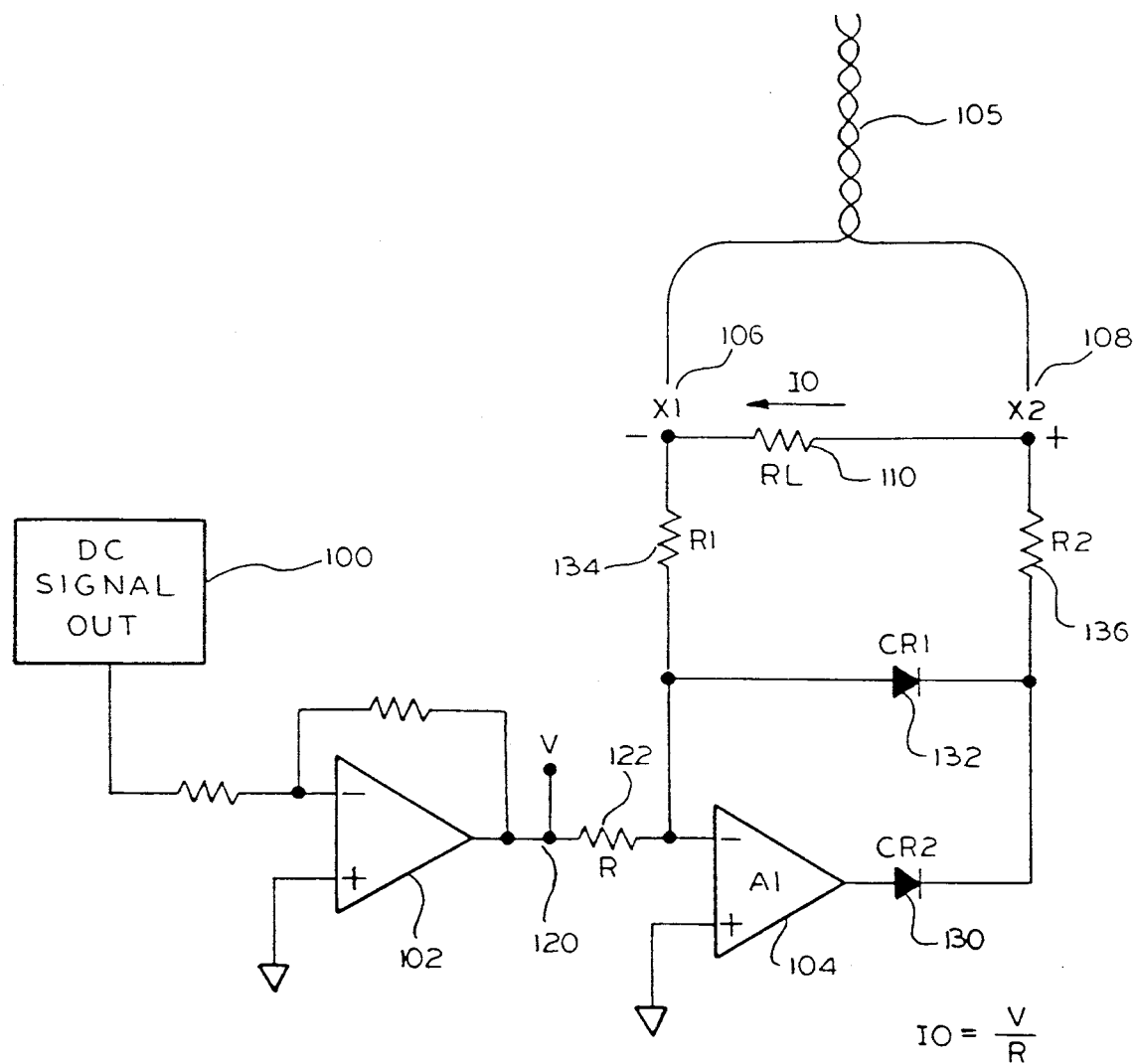
FIG. 1 is a schematic diagram of a circuit.

Referring to FIG. 1, a DC output signal is generated by apparatus 100. Operational amplifier 102 provides an output stage to buffer the DC output signal of apparatus 100. Operational amplifier 104 receives the output of operational amplifier 102.

Operational amplifier 104 is a current source for driving a 2 wire cable 105 connected at points 106 and 108. The impedance of the cable 105 connected between points 106, 108 has an effective resistance of RL 110. A current $I_0$ flows in the cable connected at points 106, 108, as is shown schematically as flowing through effective resistance RL 110. Operational amplifier 104 provides a unipolar time varying signal to cable 105. The unipolar time varying signal has a polarity having a positive potential at point 108 relative to a negative potential at point 106.

The current flow through the cable $I_0$ is given by the following expression:

$$I_0 = V/R.$$

V is the voltage measured at point 120, the output terminal of operational amplifier 102. R in the expression is the resistance of input resistor 122, where resistor 122 is an input resistor for current source operational amplifier 104.

Cable 105 may be, for example, a twisted pair of wires, a telephone line, a co-axial cable, etc.

Diode 130 permits current flow from operational amplifier 104 into point 108, as a signal being driven into the transmission cable 105.

In the event that a noise signal on the cable enters the circuit, and the noise signal has a polarity to reverse bias diode 130, the signal will be blocked by diode 130. In the event that a noise pulse has a polarity to forward bias diode 130, it will be shorted from point 106 to point 108 by diode 132. Resistors 134 and 136 serve to limit current flow that a noise pulse can generate through diode 132.

In summary, operational amplifier 104 provides a constant current source for driving a DC signal into the output cable. Diode 130 permits the output signal to be driven into the cable. Also diode 130 prevents a noise pulse having a positive polarity at point 108 relative to point 106 from entering and damaging amplifier 104. Diode 132 shorts a noise pulse having a positive polarity at point 106 relative to point 108. The current flow through diode 132 is limited by the sum of the resistance of resistor 134 and resisor 136. Resistors 134, 136 may be, for example, 500 ohms each.

It is to be understood that the above described embodiments are simply illustrative of the principles of the invention. Various other modifications and changes may be made by those skilled in the art which will embody the principles of the invention and fall within the spirit and scope thereof.

What is claimed is:

1. A protective circuit protecting electronic components transmitting an unipolar time varying signal from extraneous surge voltages on a cable, comprising:
   unipolar output means for providing an output conductive path for a signal voltage driven into said cable, and for blocking the extraneous voltages having a first polarity on said cable from entering said output means;
   shorting means for essentially shorting the extraneous voltages having a second polarity on said cable from a first conductor of said cable to a second conductor of said cable.

2. The apparatus, as in claim 1, wherein said output means comprises:
   an operational amplifier having said signal applied to an input; and
   a diode driven by an output of said operational amplifier; and said cable is driven by a current flowing through said diode.

3. The apparatus as in claim 1 wherein said shorting means is a diode in forward conduction, said diode only in a conduction state when said second polarity extraneous voltage is present.

4. A protective circuit protecting electronic components transmitting an unipolar time varying signal from extraneous voltages on a cable comprising:
   an operational amplifier having said unipolar signal connected to an input;
   a diode oriented to conduct said unipolar signal from an output of said operational amplifier to said cable, and to block extraneous voltages of the same polarity but of greater magnitude than said unipolar signal; and
   a second diode for essentially shunting a voltage of a polarity opposite the polarity of said unipolar signal from a first conductor of said cable to a second conductor of said cable.

5. The apparatus as in claim 4 further comprising: at least one resistor to limit current flow through said second diode.

6. A protective circuit protecting electronic components transmitting an unipolar time varying signal to a cable from extraneous surge voltages on the cable, comprising:
   unipolar output means for providing an output conductive path through a first terminal and a second terminal for a signal voltage driven into said cable, and for preventing the extraneous voltages having a first polarity on said cable from applied to said output means, said output means being self actuated by said signal and by said extraneous voltage;
   shorting means for essentially shorting the extraneous voltages having a second polarity on said cable, said shorting means connected between said first terminal and said second terminal, said shorting means being self actuated by said extraneous voltage.

7. The protective circuit of claim 6 wherein said unipolar output means comprises:
   an operational amplifier having said signal applied to an input; and
   a diode driven by an output of said operational amplifier; and said cable is driven by a current flowing through said diode.

8. The apparatus, as in claim 7 wherein said shorting means is a diode forward biased by the extraneous voltage having a second polarity.

9. A protective circuit protecting electronic components transmitting an unipolar time varying signal to a cable from extraneous surge voltages on the cable, comprising:
   an operational amplifier having said unipolar signal connected to an input which transmits signal current conducted by said cable;
   a blocking diode in series with said operational amplifier oriented to conduct said unipolar signal from an output of said operational amplifier, in a designed forward conduction mode, to said cable through a diode output terminal, and to block extraneous voltage of the same polarity but of greater magnitude than said unipolar signal by having a relatively high peak inverse voltage to prevent said blocking diode from conducting in an undesired reverse conduction mode; and
   a shorting diode essentially shunting a voltage of a polarity opposite the polarity of said unipolar signal in a forward conduction mode connected between said operational amplifier input and said diode output terminal, said shorting diode being of the same diode type as that of said blocking diode.

10. The protective circuit of claim 9 further including:
    at least one limiting resistor in series with said shorting diode reducing the amount of current conducted by said shorting diode, connected in a manner which avoids applying the voltage developed across said at least one limiting resistor across said operational amplifier and said shorting diode.

11. The protective circuit of claim 10 wherein said at least one limiting resistor is an input limiting resistor and an output limiting resistor, said input limiting resistor is connected between said input and a first conductor of said cable, and said output limiting resistor is connected between said output terminal and a second conductor of said cable.

12. The protective circuit of claim 9 wherein:
    said shorting diode can not affect said unipolar signal.

13. A cable driving and protective circuit transmitting an unipolar time varying signal to a cable and protecting the cable driving and protective circuit from extraneous surge voltages on the cable, comprising:
    an operational amplifier having an input and an output, and having said unipolar signal connected to an input, said operational amplifier transmitting unipolar signal current to said cable;
    a blocking diode connected to the output of said operational amplifier oriented to conduct said unipolar signal from the output of said operational amplifier, in a designed forward conduction mode with a low forward voltage drop, to said cable through a diode output terminal, and to block extraneous voltage of the same polarity but of greater magnitude than said unipolar signal by having a relatively high peak inverse voltage to prevent said blocking diode from conducting in an undesired reverse conduction mode; and
    a shorting diode essentially shunting a voltage of a polarity opposite the polarity of said unipolar signal in a forward conduction mode connected between the input of said operational amplifier and the output terminal of said diode said shorting diode being of the same diode type as that of said blocking diode.

* * * * *